United States Patent [19]

Green et al.

[11] Patent Number: 5,782,552
[45] Date of Patent: Jul. 21, 1998

[54] LIGHT ASSEMBLY

[76] Inventors: David R. Green, 1312 Victoria Avenue, Victoria, BC, Canada, V8S 4P5; L. Brock Russell, 1712 Chandler Avenue, Victoria, BC, Canada, V8S 1N6

[21] Appl. No.: 506,750

[22] Filed: Jul. 26, 1995

[51] Int. Cl.⁶ .................................................. F21S 9/00
[52] U.S. Cl. ........................... 362/183; 362/800; 362/276
[58] Field of Search ................................ 362/800, 183, 362/802, 276, 191, 153.1, 61; 313/512; 315/200 A, 150, 152, 154, 156, 158, 159; 320/1

[56] References Cited

U.S. PATENT DOCUMENTS

| | | |
|---|---|---|
| 2,700,754 | 1/1955 | McCullough ........................ 362/153.1 |
| 3,950,844 | 4/1976 | Wisbey ................................ 313/512 |
| 4,050,834 | 9/1977 | Lee . |
| 4,603,496 | 8/1986 | Latz et al. ............................ 313/512 |
| 4,634,953 | 1/1987 | Shoji et al. . |
| 4,843,280 | 6/1989 | Lumbard et al. ..................... 313/512 |
| 4,959,603 | 9/1990 | Yamamoto et al. .................... 320/1 |
| 5,252,893 | 10/1993 | Chacham et al. .................. 362/153.1 |
| 5,262,756 | 11/1993 | Chien .................................... 362/183 |
| 5,412,381 | 5/1995 | Dicks ................................. 340/908.1 |

*Primary Examiner*—Ira S. Lazarus
*Assistant Examiner*—Sara Sachie Raab

[57] ABSTRACT

A light assembly comprising a light-emitting diode (LED), a rechargeable capacitor to energize the diode, and a solar cell to recharge the capacitor. Preferably, there is circuitry to enable charging of the capacitors and circuitry to enable use of the solar cell as a photosensor to selectively energize the LED when the ambient light is below a pre-determined level, and to stop energizing the LED when the ambient light is above a pre-determined level.

8 Claims, 2 Drawing Sheets

LIGHT ASSEMBLY

FIELD OF INVENTION

This invention relates to a light assembly.

DESCRIPTION OF THE PRIOR ART

Provision of hazard or marker lighting in remote areas such as parks, trails, floating docks, temporary airstrips and logging roads is very expensive with standard technology. Even hazard lights on highways are expensive to install, with the result that hazard marking on highways is usually done with reflectors instead of lights.

The key limitation of traditional technology is that electricity must be provided to the hazard/marker lights, and in locations remote from power lines, provision of electricity is prohibitively expensive. Solar panels have provided an independent power source that allows hazard/marker lighting to be installed in some of these locations. However, solar installations have not been particularly widespread due to the costs involved in the installation and maintenance, problems with battery systems, and the susceptibility of the lighting assembly to vandalism.

In U.S. Pat. No. 4,050,834, Lee describes an advance in which light-emitting diodes (LEDs) are used to replace standard light bulbs in a solar-powered light assembly to make a lane marker for traffic. Because of their excellent power efficiency and durability, the use of LEDs greatly reduces the size and cost of a solar light assembly. However, Lee's light assembly still requires the use of a battery as a means of energy storage to power the light at night when the solar panel is not producing electricity. The use of a rechargeable battery poses considerable limitations on the light assembly. Rechargeable batteries last only 1-2 years, and then require replacement. This means the light assembly must be removable and have a battery compartment, and that regular servicing is scheduled. A removable light with a battery compartment is vandal-prone, and the cost of battery replacement and disposal is unattractive, with the result that the Lee invention has not been commercially successful.

U.S. Pat. No. 4,634,953 to Shoji et al describes a solar-powered watch in which capacitors (or supercapacitors as they are commonly known) are used as the energy storage means instead of batteries. Capacitors offer the advantage that they are durable and do not require servicing: they can be expected to last for decades. The disadvantages of capacitors include the requirement that they must be charged to a relatively high voltage compared to a battery (typically 5.5 volts), and the fact that the voltage which is supplied by the capacitor to the load is not stable like a battery, but declines exponentially to zero. Shoji et al describe two voltage regulators to overcome these problems, one which increases the voltage generated by the solar panel, and the other which stabilizes the voltage which is produced by the capacitor so that it can be used to run electronics such as a watch.

The present invention capitalizes on the strengths of LED and capacitor technologies, but does not require either of the voltage converters described by Shoji et al. The resulting light assembly is a device of striking simplicity, power efficiency, and durability which is not prone to vandalism, and which requires no servicing for periods measured in decades.

SUMMARY OF THE INVENTION

Accordingly, in the first aspect, the present invention is a light assembly comprising a light-emitting diode (LED), a capacitor to energize said LED, and a solar cell to charge the capacitor.

Desirably, the assembly includes circuitry to enable use of the solar cell as a photosensor to selectively enable energizing of the LED when the ambient light is below a pre-determined level, and to stop energizing the LED when the ambient light is above a pre-determined level.

In a particularly desirable aspect, the light assembly is housed in a plexiglass shell and potted with appropriate potting compounds. Potting techniques are known, particularly for small electronic components. The light assembly of the present invention is designed for potting and this assists in enhancing the durability and vandal-proof nature of the device.

When potted, the LED may protrude from the assembly or the complete light assembly may be embedded within the potting compounds.

DESCRIPTION OF THE PREFERRED EMBODIMENTS

Figure 1:
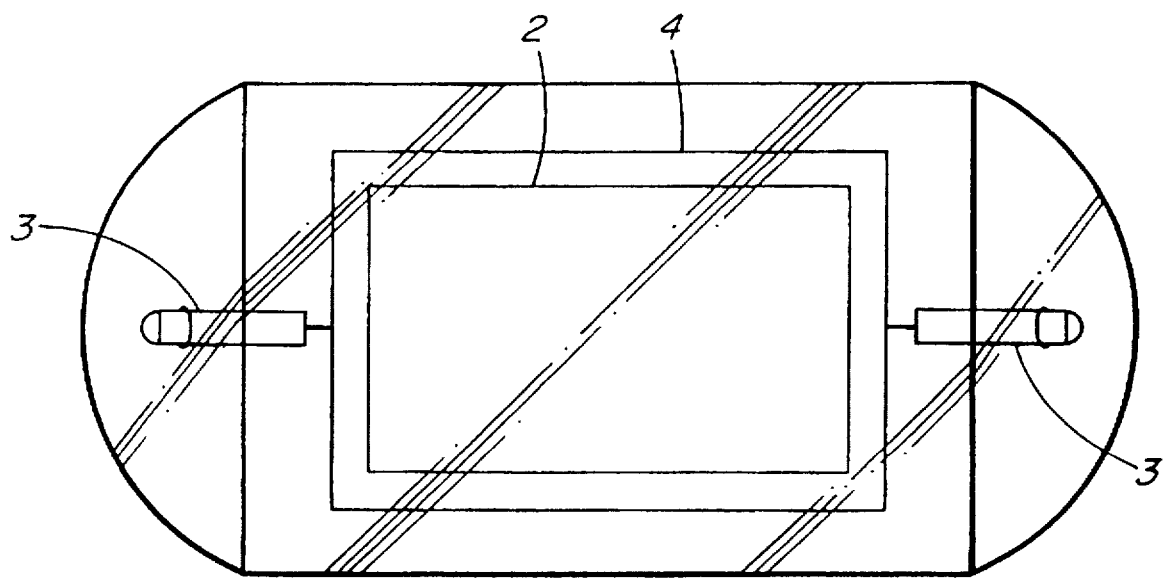
FIG. 1 is a plan view of the light assembly according to the present invention.
Figure 2:
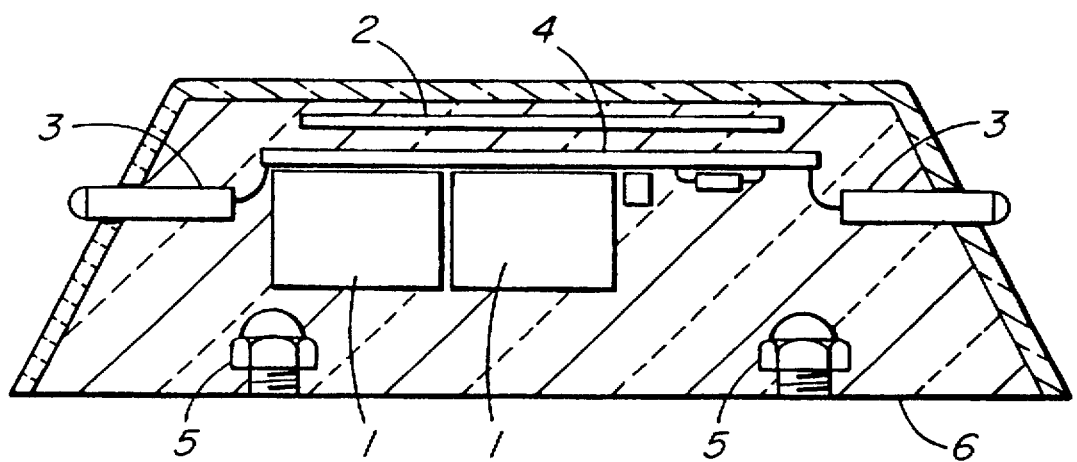
FIG. 2 is a side elevation of the assembly of FIG. 1.

FIGS. 1 and 2 show a light assembly comprising a pair of light-emitting diodes (LEDs) arranged at one end of the assembly. There are rechargeable capacitors 1 to energize the LEDs 3 and a solar cell 2 for recharging the capacitors 1. Circuitry 4 is provided to allow recharging of the solar cell 2 to energize the LEDs 3. The assembly is encapsulated in potting resins 6 within a protective shell 7.

Figure 3:
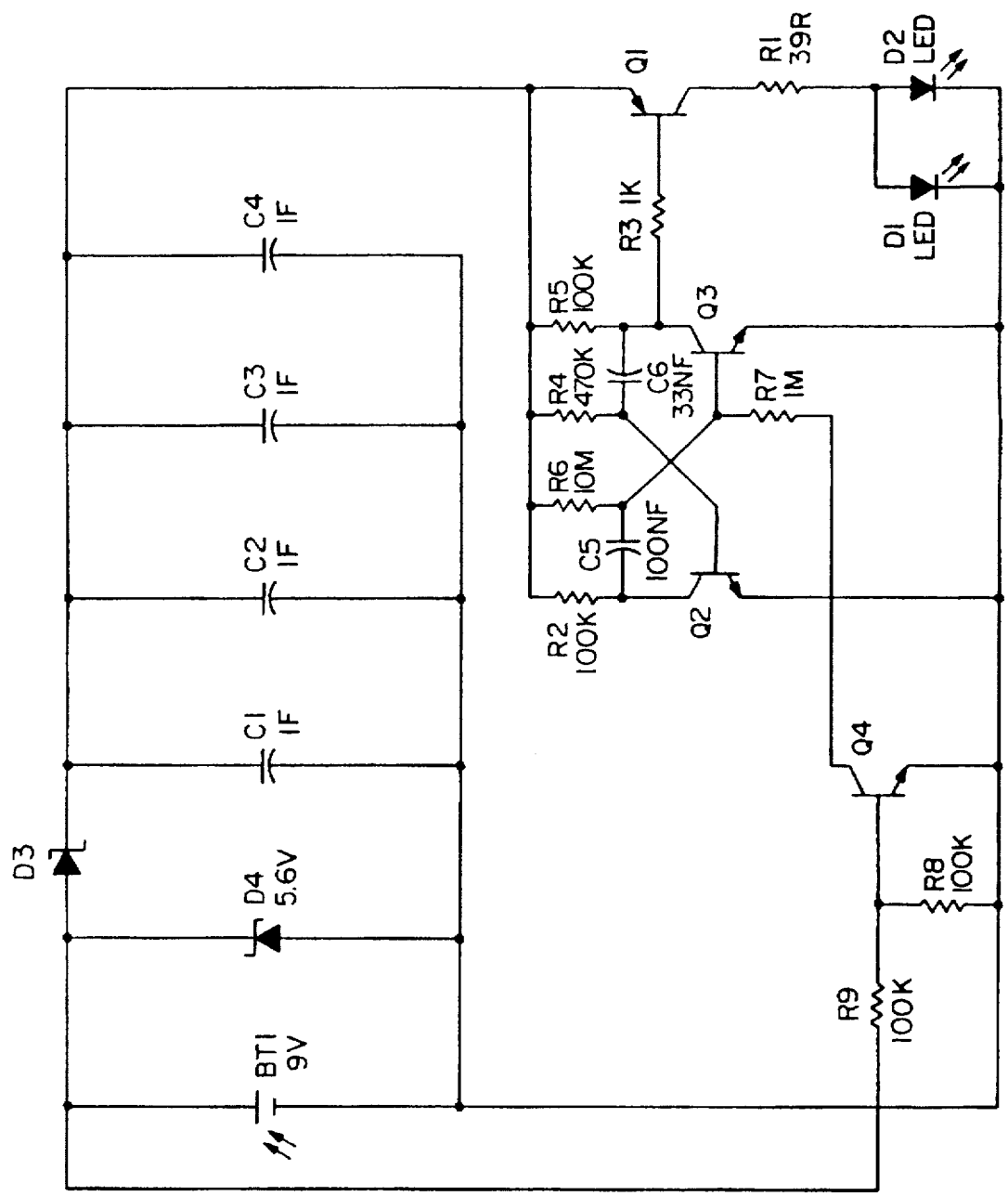
FIG. 3 is a circuit diagram of the invention.

FIG. 3 shows a circuit in which the solar cell directly charges four supercapacitors C1–C4 via blocking diode D3, which prevents discharge of said capacitors back through solar cell during darkness. Zener diode D4 prevents overcharging of the capacitors, limiting charge to 5.6 volts. The pulse rate and pulse duration of the two LED lights is controlled by the astable multivibrator consisting of transistors Q2 and Q3, capacitors C5 and C6, and associated resistors. Q1 is the driver transistor for the LEDs.

Light sensitive switch circuitry is provided by transistor Q4 and resistors R8 and R9 which are driven by the solar cell. This circuitry enables use of the solar cell as a photosensor which selectively energizes the LEDs when ambient light is below a pre-determined level. The circuitry also stops energizing of the LEDs when the ambient light is above a pre-determined level and enables charging of the capacitors by the solar cell. The circuitry therefore ensures that, at night, the LEDs turn on powered by the capacitors, and that during the day, the LEDs are turned off and the capacitors are recharged. There is no requirement for any physical switch on the light assembly. This circuitry uses a solar panel with sufficiently high voltage output that no step-up voltage conversion is required to charge the capacitors fully. This avoids the additional power requirements and loss of reliability incurred by using a step-up voltage converter. Similarly, no voltage conversion or stabilization is required to drive the LEDs. The energy stored in the capacitors is used to directly drive the LEDs, which is possible since LEDs are designed to operate over a wide voltage range. The elimination of voltage conversion and stabilization circuitry avoids expense, potential component failure, and power loss.

The manufacture of the light assembly includes means to mount the assembly. In the preferred embodiment, acorn nuts 5 are placed in the potting compound to provide for bolt mounting of the assembly. Other means of mounting can include a bolt or screw placed in the potting compound, an adhesive pad mounted to the bottom of the assembly, or gluing/epoxying of the light assembly to a surface. Since no servicing of the light assembly is required, the mounting of the light assembly may be permanent.

A reflective layer may be included in the light assembly to facilitate its use as a road marker.

The potting compounds 6 may be any appropriate potting compounds suitable for potting electronic components, providing of course, that the layer above the solar panel and adjacent to the LEDs is transparent. Potting compounds may include epoxy, polyester or silicone compounds. The potting compounds may be set in a plastic casing or may be gel-coated to provide protection from ultraviolet radiation and from impact.

This light assembly is intended to be used in a broad variety of applications and as such, the LEDs may be yellow and/or red for use in marine environments to mark starboard and port. In applications where maximum range of the light is desired, the LEDs may protrude from the housings. The LEDs may be located at one end of the assembly for unidirectional marking, such as on roads, or may be bi-directional or circular. In order to achieve 360 degree visibility, a light diffuser may be included in the assembly.

The device is sufficiently small and durable that it can be used in the centre of highways where the ubiquitous catseye is presently used, either to mark lanes or to indicate crosswalks or other significant features. The simplicity, durability, and vandal-resistance of the design is believed to be of major significance in providing hazard or marker lighting for a broad range of applications. It is envisaged that decades of use can be obtained from a single light assembly.

Although the foregoing invention has been described in some detail by way of illustration and example for purposes of clarity of understanding, it will be readily apparent to those of ordinary skill in the art that, in the light of the teachings of this invention, certain changes and modifications may be made thereto without departing from the spirit or scope of the appended claims.

I claim:

1. A light assembly comprising:

an encapsulated light emitting diode;

a rechargeable capacitor in electrical contact with said LED to energize said LED;

a solar cell in electrical contact with said capacitor, to recharge said capacitor;

circuitry to enable recharging of the capacitor and to enable the LED to flash for several hours after solar illumination has ceased; and potting material that completely or substantially encapsulates the light assembly.

2. A light assembly as claimed in claim 1, including circuitry to enable use of the solar cell as a photosensor to selectively energize the LED when the ambient light is below a pre-determined level, to stop energizing the LED when the ambient light is above a pre-determined level, and to enable charging of the capacitor by the solar cell when the ambient light is above a pre-determined level.

3. A light assembly as claimed in claim 1, in which the LED protrudes from the potting compound.

4. A light assembly as claimed in claim 1, in which the LED is completely embedded within the potting compound.

5. A light assembly as claimed in claim 1, in which the potting compound is selected from one or more of epoxy, polyester, or silicone compounds.

6. A light assembly as claimed in claim 1, in which the light assembly is embedded in potting compound and encased in an acrylic or polycarbonate transparent housing.

7. A light assembly comprising:

an encapsulated light emitting diode (LED);

a rechargeable capacitor in electrical contact with said LED to energize said LED;

a solar cell in electrical contact with said capacitor, to recharge said capacitor;

circuitry to enable use of the solar cell as a photosensor to selectively energize the LED when the ambient light is below a pre-determined level, to stop energizing the LED when the ambient light is above a pre-determined level; and potting material that completely or substantially encapsulates the light assembly.

8. A light assembly comprising:

a light emitting diode (LED);

a rechargeable capacitor in electrical contact with said LED to energize said LED;

a solar cell in electrical contact with said capacitor, to recharge said capacitor;

circuitry to enable use of the solar cell as a photosensor to selectively energize the LED when the ambient light is below a pre-determined and to stop energizing the LED when the ambient light is above a pre-determined level, and to enable charging of the capacitor by the solar cell when the ambient light is above a pre-determined level so that the LED flashes for several hours after solar illumination has ceased;

the assembly being potted in a potting compound;

said LED protruding from the potting compound.

* * * * *